United States Patent
Kuo et al.

(10) Patent No.: US 7,059,281 B2
(45) Date of Patent: Jun. 13, 2006

(54) FOUR STROKE ENGINE AUTO-IGNITION COMBUSTION

(75) Inventors: Tang-Wei Kuo, Troy, MI (US); James A. Eng, Troy, MI (US); Paul M. Najt, Bloomfield Hills, MI (US); Barry L. Brown, Lake Orion, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/041,795

(22) Filed: Jan. 24, 2005

(65) Prior Publication Data

US 2006/0005788 A1 Jan. 12, 2006

Related U.S. Application Data

(60) Provisional application No. 60/587,101, filed on Jul. 12, 2004.

(51) Int. Cl.
F02B 75/02 (2006.01)
F02B 75/12 (2006.01)
F02M 25/07 (2006.01)

(52) U.S. Cl. .................... 123/64; 123/58.8; 123/568.14
(58) Field of Classification Search .................. 123/21, 123/58.8, 64, 568.14, 90.11, 90.15, 90.16, 123/90.17, 90.18, 295, 299, 300, 305
See application file for complete search history.

(56) References Cited

U.S. PATENT DOCUMENTS

| | | | | |
|---|---|---|---|---|
| 4,809,511 | A | * | 3/1989 | Bajulaz .................... 60/712 |
| 4,917,054 | A | * | 4/1990 | Schmitz .................... 123/58.8 |
| 5,010,860 | A | * | 4/1991 | Broussard .................... 123/64 |
| 6,082,342 | A | | 7/2000 | Duret et al. ........... 123/568.14 |
| 6,386,177 | B1 | | 5/2002 | Urushihara et al. ......... 123/299 |
| 6,615,771 | B1 | * | 9/2003 | Denger et al. ................ 123/21 |
| 6,659,071 | B1 | * | 12/2003 | LaPointe et al. ............. 123/299 |
| 6,758,174 | B1 | * | 7/2004 | Fuerhapter ................... 123/64 |
| 6,918,358 | B1 | * | 7/2005 | Hu ............................. 123/58.8 |
| 2006/0005804 | A1 | * | 1/2006 | Kuo et al. .................. 123/295 |
| 2006/0005806 | A1 | * | 1/2006 | Kuo et al. .................. 123/299 |

FOREIGN PATENT DOCUMENTS

| EP | WO01/46572 | 6/2001 |
|---|---|---|
| EP | WO01/46573 | 6/2001 |

* cited by examiner

Primary Examiner—Willis R. Wolfe, Jr.
(74) Attorney, Agent, or Firm—Kathryn A. Marra (57) ABSTRACT

A method of operating a four-stroke gasoline direct-injection controlled auto-ignition combustion engine includes opening both the intake and exhaust valves during terminal portions of the expansion strokes and initial portions of the contraction strokes, injecting fuel directly into the combustion chamber for mixing with retained gases and igniting the fuel near the ends of the contraction strokes. In the process, combustion gases are expanded to produce power during major portions of the expansion strokes, combusted gases are blown down into the exhaust outlet and the air inlet and are partially redrawn into the cylinder with fresh air during the terminal portions of the expansion strokes so the air charges are heated by the hot exhaust gases. Portions of the charges re-expelled and the remaining portions of the charges and injected fuel are compressed for ignition of the dilute fuel/air and exhaust gas mixture. Substantial reductions of NOx emissions result from the method.

13 Claims, 6 Drawing Sheets

FOUR STROKE ENGINE AUTO-IGNITION COMBUSTION

CROSS REFERENCE TO RELATED APPLICATIONS

This application claims priority from U.S. Provisional Patent Application No. 60/587,101 filed Jul. 12, 2004.

TECHNICAL FIELD

The present invention presents a method for operating a four-stroke gasoline direct-injection controlled auto-ignition combustion engine, at least at low speed and load including idle

BACKGROUND OF THE INVENTION

To improve thermal efficiency of gasoline internal combustion engines, dilute combustion—using either air or re-circulated exhaust gas—is known to give enhanced thermal efficiency and low NOx emissions. However, there is a limit at which an engine can be operated with a diluted mixture because of misfire and combustion instability as a result of a slow burn. Known methods to extend the dilution limit include 1) improving ignitability of the mixture by enhancing ignition and fuel preparation, 2) increasing the flame speed by introducing charge motion and turbulence, and 3) operating the engine under controlled auto-ignition combustion.

The controlled auto-ignition process is sometimes called the Homogeneous Charge Compression Ignition (HCCI) process. In this process, a mixture of combusted gases, air, and fuel is created and auto-ignition is initiated simultaneously from many ignition sites within the mixture during compression, resulting in very stable power output and high thermal efficiency. The combustion is highly diluted and uniformly distributed throughout the charge, so that the burned gas temperatures and hence NOx emissions are substantially lower than those of traditional spark ignition engines based on a propagating flame front and diesel engines based on an attached diffusion flame. In both spark ignition and diesel engines, the burned gas temperatures are highly heterogeneous within the mixture with very high local temperatures creating high NOx emissions.

Engines operating under controlled auto-ignition combustion have been successfully demonstrated in two-stroke gasoline engines using a conventional compression ratio. It is believed that the high proportion of burned gases remaining from the previous cycle, i.e., the residual content, within the two-stroke engine combustion chamber is responsible for providing the high mixture temperature necessary to promote auto-ignition in a highly diluted mixture.

In four-stroke engines with traditional valve means, the residual content is low and controlled auto-ignition at part load is difficult to achieve. Methods to induce controlled auto-ignition at low and part loads include: 1) intake air heating, 2) variable compression ratio, and 3) blending gasoline with ignition promoters to create a more easily ignitable mixture than gasoline. In all the above methods, the range of engine speeds and loads in which controlled auto-ignition combustion can be achieved is relatively narrow.

Engines operating under controlled auto-ignition combustion have been demonstrated in four-stroke gasoline engines using variable valve actuation with unconventional valve means. The following are descriptions involve valve strategies in which a high proportion of residual combustion products from a previous combustion cycle is retained to provide the necessary conditions for auto-ignition in a highly diluted mixture. The range of engine speeds and loads in which controlled auto-ignition combustion can be achieved is greatly expanded using a conventional compression ratio.

In one instance, a four-stroke internal combustion engine is reported to provide for auto ignition by controlling the motion of the intake and exhaust valves of a combustion chamber to ensure that a fuel/air charge is mixed with combusted gases to generate conditions suitable for auto-ignition. The described engine has a mechanically cam-actuated exhaust valve that is closed earlier in the exhaust stroke than normal four-stroke engines to trap combusted gases for subsequent mixing with an intake of fuel and air mixture.

Another method is described of operating a four-stroke internal combustion engine in which combustion is achieved at least partially by an auto-ignition process. Flows of fuel/air charge and combusted gases are regulated by hydraulically controlled valve means in order to generate conditions in the combustion chamber suitable for auto-ignition operation.

The valve means used comprises an intake valve controlling the flow of fuel/air mixture into the combustion chamber from an inlet passage and an exhaust valve controlling exhaust combusted gases from the combustion chamber to an exhaust passage. The exhaust valve opens (EVO) at approximately 10 to 15 degrees before bottom dead center in the expansion stroke, and closes (EVC) during the exhaust stroke in a range of 90 to 45 degrees before top dead center. The intake valve is opened (IVO) later in the four-stroke cycle than usual in a normal four-stroke engine in the range of 45 to 90 degrees after top dead center during the intake stroke.

The early exhaust valve closing and late intake valve opening provide a negative valve overlap period (EVC-IVO) where both exhaust and intake valves are closed for trapping of combusted gas which later mixes with the inducted fuel/air charge during the intake stroke and thereby promotes the auto-ignition process. The intake valve is then closed (IVC) roughly 30 degrees after bottom dead center in the compression stroke. This is generally referred to as an exhaust re-compression valve strategy.

In another described method of operating a direct-injection gasoline four-stroke internal combustion engine, combustion is achieved at least partially by an auto-ignition process. Flows of air and combusted gases are regulated by a hydraulically controlled valve means. The fuel is delivered directly into the combustion chamber by a gasoline injector. The gasoline injector is said to inject fuel during either the intake stroke or the subsequent compression stroke in a single engine cycle.

Using exhaust re-compression valve strategy in conjunction with a gasoline direct injector having multiple injection capability during a single engine cycle, we and others have demonstrated that the range of engine speeds and loads in which controlled auto-ignition combustion can be achieved is greatly expanded using a conventional compression ratio. Further, we have also demonstrated that low load fuel economy and ability to start the engine cold are superior using exhaust re-compression valve strategy coupled with stratified ignition. However, torque fluctuation increases during idle and low load engine operations may be a concern. This is the subject of the present invention.

SUMMARY OF THE INVENTION

The present invention presents a method for operating a four-stroke gasoline direct-injection controlled auto-ignition combustion engine at low speed and load including idle with acceptable torque fluctuation. The method consists of double opening of both intake and exhaust valves and a split injection strategy with equal amount of fuel split. Supplemental means for controlling air delivery may also be included.

These and other features and advantages of the invention will be more fully understood from the following description of certain specific embodiments of the invention taken together with the accompanying drawings.

DESCRIPTION OF THE PREFERRED EMBODIMENT

For simplicity, the following descriptions will address the present invention in its application to a single cylinder direct-injection gasoline four-stroke internal combustion engine, although it should be appreciated that the present invention is equally applicable to a multi-cylinder direct-injection gasoline four-stroke internal combustion engine.

Figure 1:
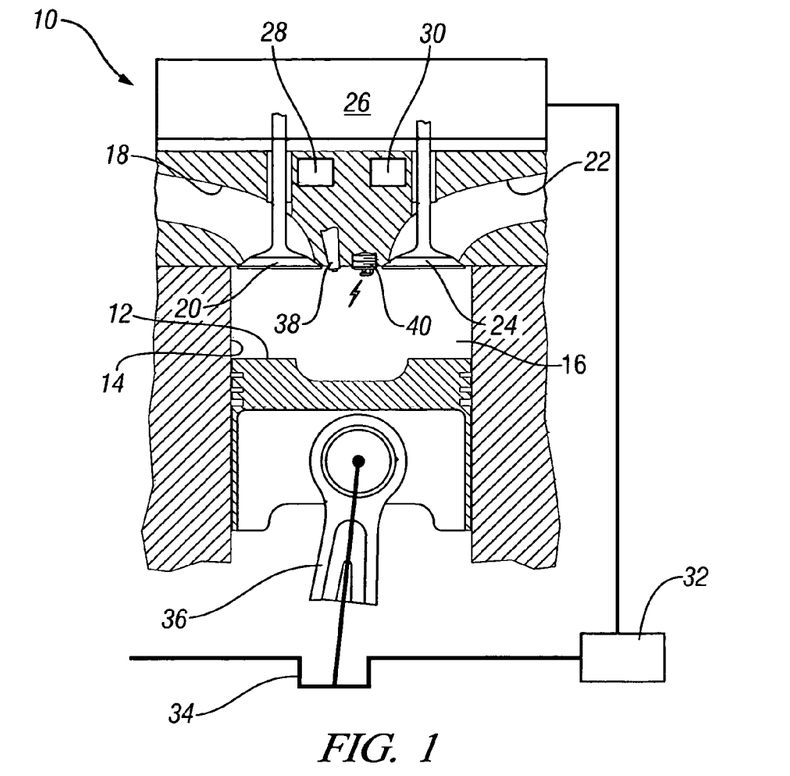
FIG. 1 is schematic illustration of a single cylinder direct-injection gasoline four-stroke internal combustion engine according to the present invention.

A schematic representation of a first embodiment of single-cylinder direct-injection four-stroke internal combustion engine 10 is given in FIG. 1. In the figure a piston 12 is movable in a cylinder 14 and defines with the cylinder 14 a variable volume combustion chamber 16. An intake passage 18 supplies air into the combustion chamber 16. Flow of air into the combustion chamber 16 is controlled by an intake valve 20. Combusted gases can flow from the combustion chamber 16 via an exhaust passage 22 and flow of combusted gases through the exhaust passage 22 is controlled by an exhaust valve 24.

The engine 10, as shown in FIG. 1, has a hydraulically controlled valve train with an electronic controller 26 which is programmable and hydraulically controls the opening and closing of both the intake 20 and exhaust 24 valves. The electronic controller 26 will control the movement of the intake valve 20 and exhaust valve 24 having regard to the position of the intake and exhaust valves 20 and 24 as measured by two position transducers 28 and 30. The controller 26 will also have regard to the position of the engine 10, which will be measured by a rotation sensor 32 which is connected to a crankshaft 34 of the internal combustion engine, the crankshaft 34 being connected by a connecting rod 36 to the piston 12 reciprocable in the cylinder 14.

A gasoline direct injector 38, controlled by an electronic controller 26, is used to inject fuel directly into the combustion chamber 16. A spark plug 40, controlled also by an electronic controller 26, is used in conjunction with the fuel injector and a combustion chamber design for enhanced combustion phasing control at low load and for engine cold starting.

Figure 2:
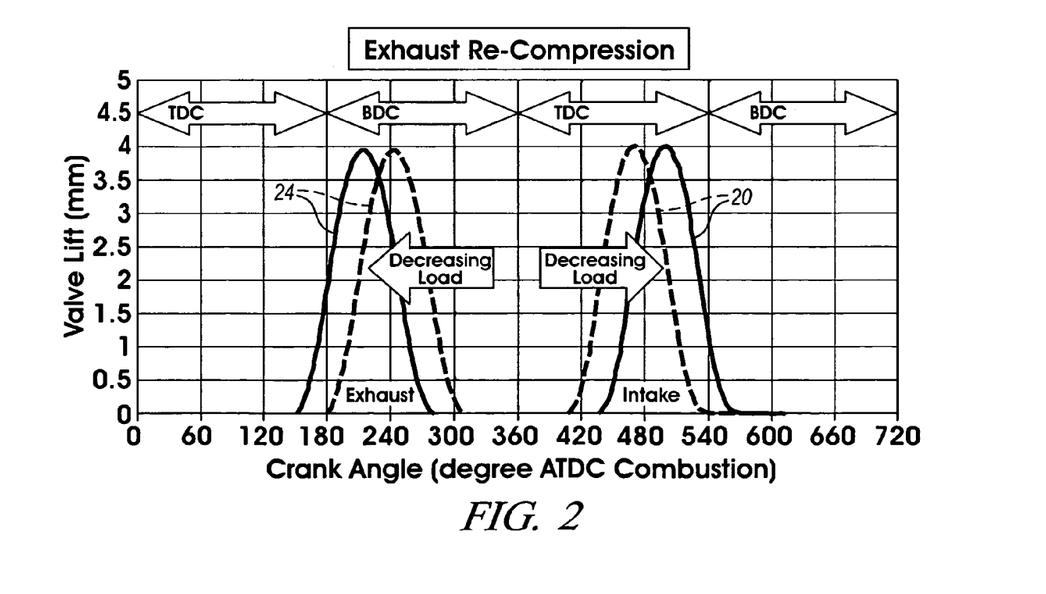
FIG. 2 is a graph of valve lift profiles as a function of crank angle for the exhaust and intake valves of a four-stroke internal combustion engine with variations in engine load using exhaust re-compression valve strategy.

FIG. 2 illustrates control of the motion of the intake valve 20 and exhaust valve 24 for a four-stroke controlled auto-ignition combustion engine using exhaust re-compression valve strategy. It shows actual valve lift profiles employed during a load sweep using the exhaust re-compression valve strategy with a simpler mechanical two-step with equal cam phaser VVA system. While the intake valve 20 and exhaust valve 24 in the present invention may be electro-hydraulically actuated, they could be actuated in another suitable manner, such as mechanically or electrically using electro-magnetic force.

In the figure, the exhaust valve 24 is seen to phase earlier while the intake valve 20 is seen to phase later with decreasing engine load. The advanced phasing for the exhaust valve in conjunction with the retarded phasing for the intake valve provides increased negative valve overlap periods where both exhaust and intake valves are closed for trapping of more combusted gas in the cylinder. This trapped residual gas mixes later with the fuel/air charge inducted during the intake stroke and thereby promotes the auto-ignition process at lower loads.

Figure 3:
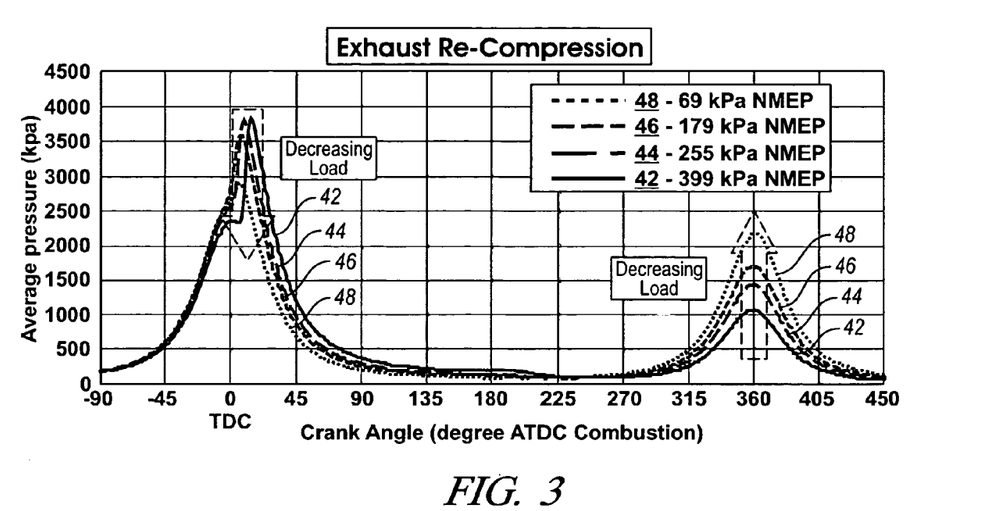
FIG. 3 is a graph of measured cylinder pressures as a function of crank angle for a four-stroke internal combustion engine with variations in engine load using the exhaust re-compression valve strategy.

FIG. 3 shows the measured cylinder pressures as functions of crank angle for a four-stroke internal combustion engine with variations in engine load using the exhaust re-compression valve strategy. It can be seen from the figure that the peak pressures during main combustion (lines 42, 44, 46, 48) decrease with decreasing engine load. However, the opposite is true for peak pressures around TDC of the exhaust stroke (360 degrees ATDC combustion). In particular, the larger the negative valve overlap, the higher the peak pressure at the end of the exhaust stroke. This indicates the trapping of more combusted gas in the cylinder. At the lowest load 48 (69 kPa NMEP), the peak pressure during main combustion (around 5 degrees ATDC combustion) is only about 600 kPa higher than the peak pressure around TDC of the exhaust stroke.

Although these peak pressure differences are characteristic of the exhaust re-compression valve strategy used in order to induce controlled auto-ignition combustion, it can be perceived as a source of torque fluctuation from driver's standpoint. This increase in peak-to-peak torque fluctuation is clearly illustrated in FIG. 4 where calculated torques as functions of crank angle due to pressure force are presented for engine operations (for a four-cylinder engine configuration) with traditional throttled SI 50, exhaust re-breathing HCCI 52, exhaust re-compression HCCI 54 and the present invention 56 at an engine speed of 1000 rpm and an average torque output of 15.2 Newton Meters (Nm).

In order to minimize torque fluctuation for four-stroke engine operation with exhaust re-compression HCCI, a valve strategy that employs double openings of both intake and exhaust valves is utilized according to the present invention. It is an extension of our earlier inventions where double openings of either exhaust or intake valves are used to effectively extend the low load engine operation limit of a controlled auto-ignition engine. FIGS. 5–8 show the valve lift profiles and corresponding injection strategy used for each valve strategy examined.

Figure 5:
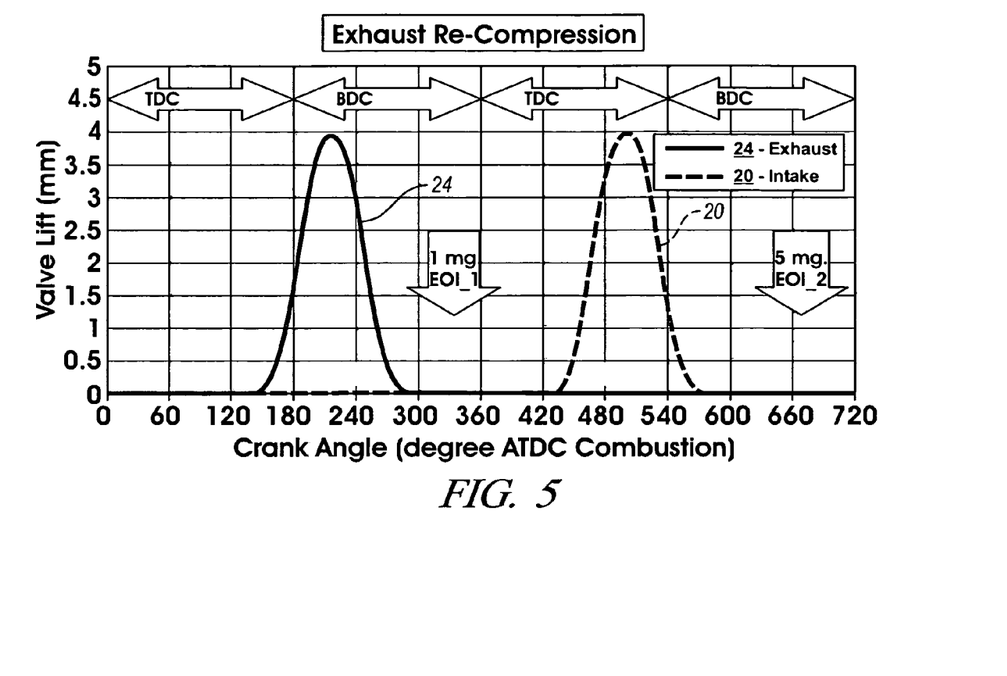
FIG. 5 is a graph of valve lift profiles as a function of crank angle together with the corresponding end of injection timings and fuel split for a four-stroke internal combustion engine using exhaust re-compression valve strategy at a fueling rate of 6 mg/cycle and 1000 rpm.

FIG. 5 shows the exhaust 24 and intake 20 valve lift profiles as a function of crank angle together with the corresponding end of injection timings and fuel split for a four-stroke internal combustion engine using exhaust re-compression valve strategy at a fueling rate of 6 mg/cycle and 1000 rpm.

Figure 6:
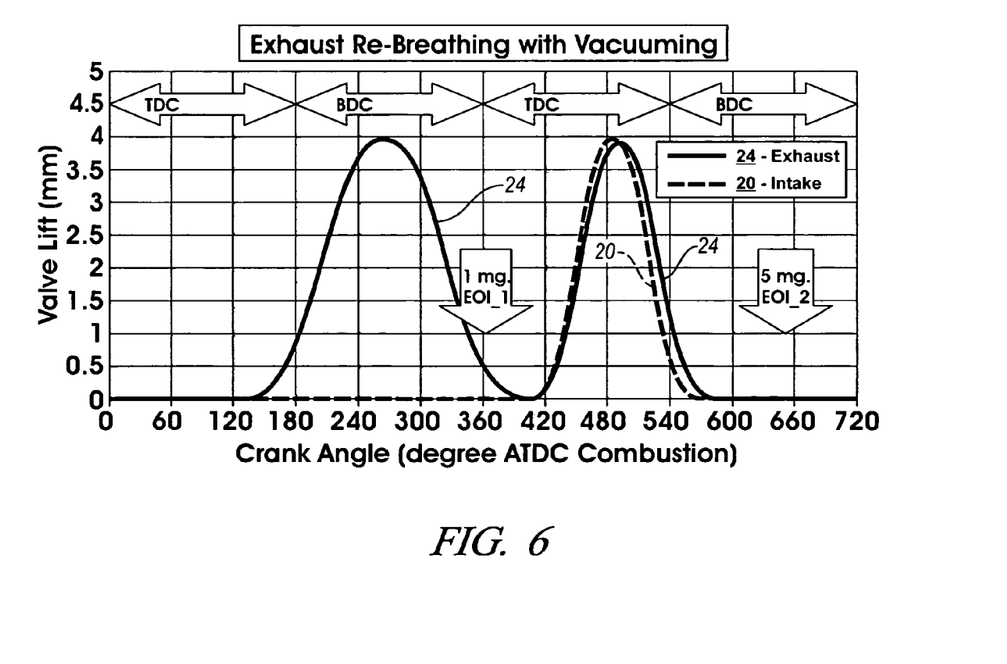
FIG. 6 is a graph of valve lift profiles as a function of crank angle together with the corresponding end of injection timings and fuel split for a four-stroke internal combustion engine using exhaust re-breathing valve strategy at a fueling rate of 6 mg/cycle and 1000 rpm.

FIG. 6 shows the valve lift profiles 24, 20 as a function of crank angle together with the corresponding end of injection timings and fuel split for a four-stroke internal combustion engine using exhaust re-breathing valve strategy at a fueling rate of 6 mg/cycle and 1000 rpm.

Figure 7:
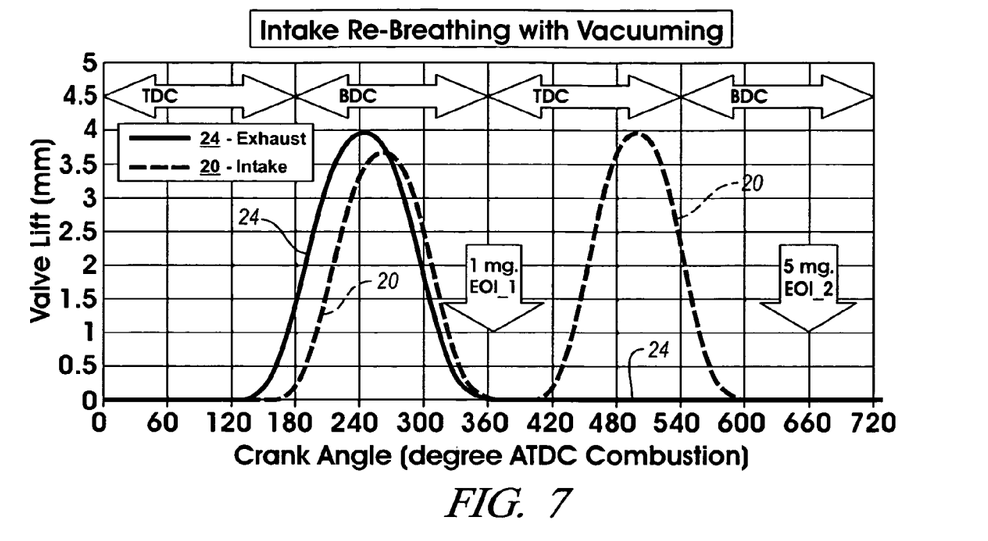
FIG. 7 is a graph of valve lift profiles as a function of crank angle together with the corresponding end of injection timings and fuel split for a four-stroke internal combustion engine using intake re-breathing valve strategy at a fueling rate of 6 mg/cycle and 1000 rpm.

FIG. 7 shows the valve lift profiles 24, 20 as a function of crank angle together with the corresponding end of injection timings and fuel split for a four-stroke internal combustion engine using intake re-breathing valve strategy at a fueling rate of 6 mg/cycle and 1000 rpm.

Figure 8:
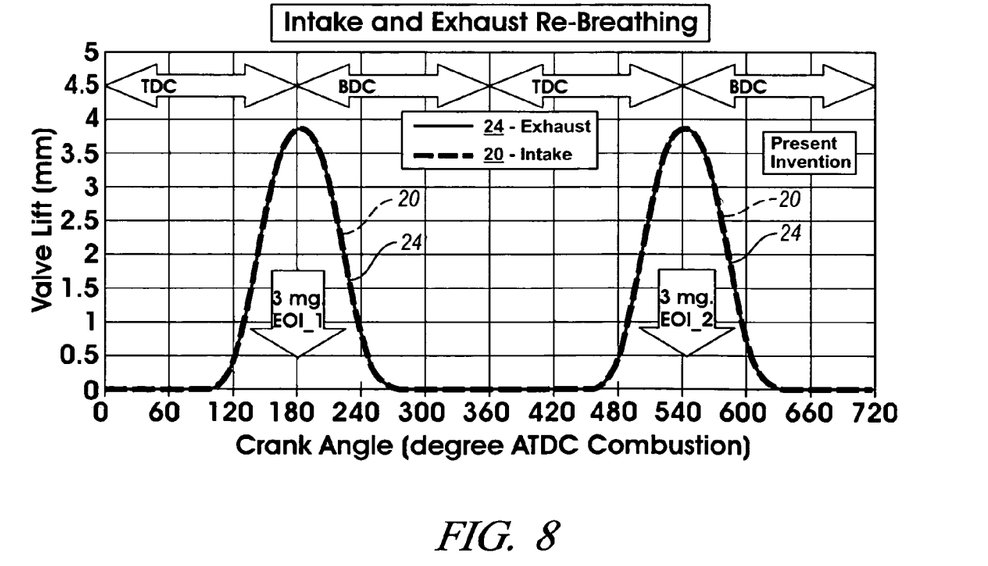
FIG. 8 is a graph of valve lift profiles as a function of crank angle together with the corresponding end of injection timings and fuel split for a four-stroke internal combustion engine using double opening of both intake and exhaust valves at a fueling rate of 6 mg/cycle and 1000 rpm.

FIG. 8 shows the intake and exhaust valve lift profiles 20, 24 as a function of crank angle together with the corresponding end of injection timings and fuel split for a four-stroke internal combustion engine using double opening of both intake and exhaust valves at a fueling rate of 6 mg/cycle and 1000 rpm.

In general, a split injection strategy with 1 mg fuel injection around TDC intake and 5 mg fuel injection during the compression stroke is used for the valve strategies shown in FIGS. 5–7. FIG. 8, however, uses an equal fuel split according to the present invention. Both valve timings and durations shown in FIG. 8 are not optimized for either performance or emissions. The conditions shown are chosen for demonstration of a specific embodiment of the present invention.

Figure 4:
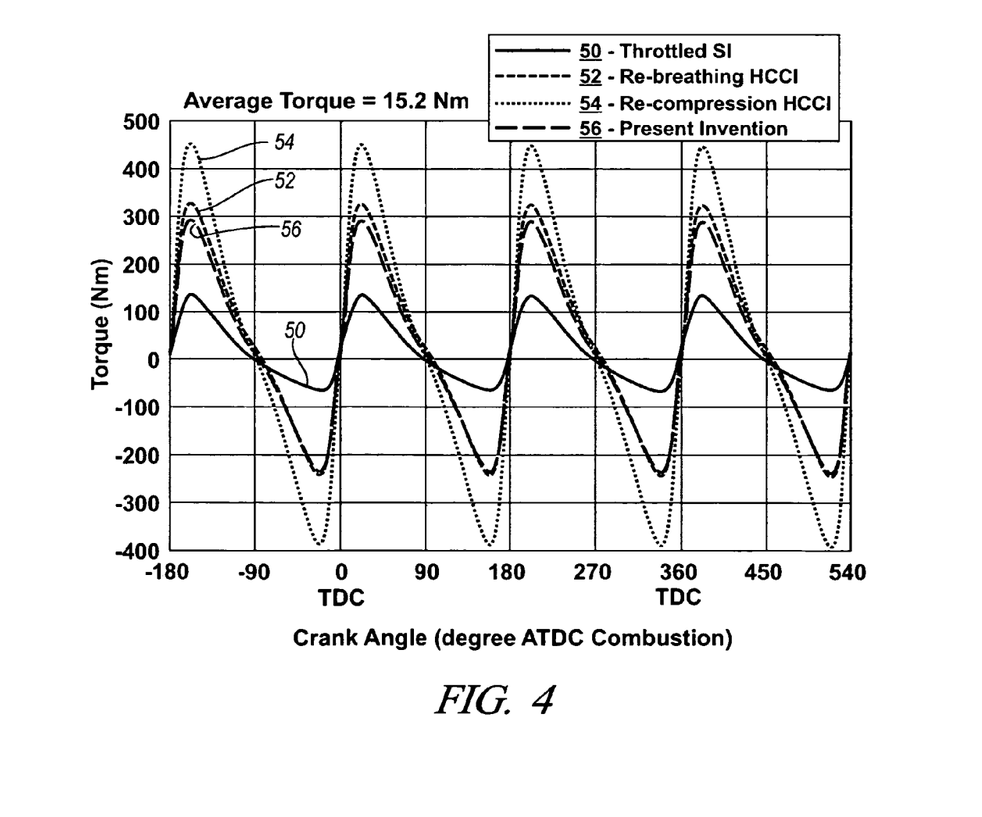
FIG. 4 is a graph of calculated torque due to pressure force as a function of crank angle for engine operation with traditional throttled SI, exhaust re-breathing, re-compression HCCI, and the present invention at an engine speed of 1000 rpm and average torque output of 15.2 Newton meters (Nm)
Figure 9:
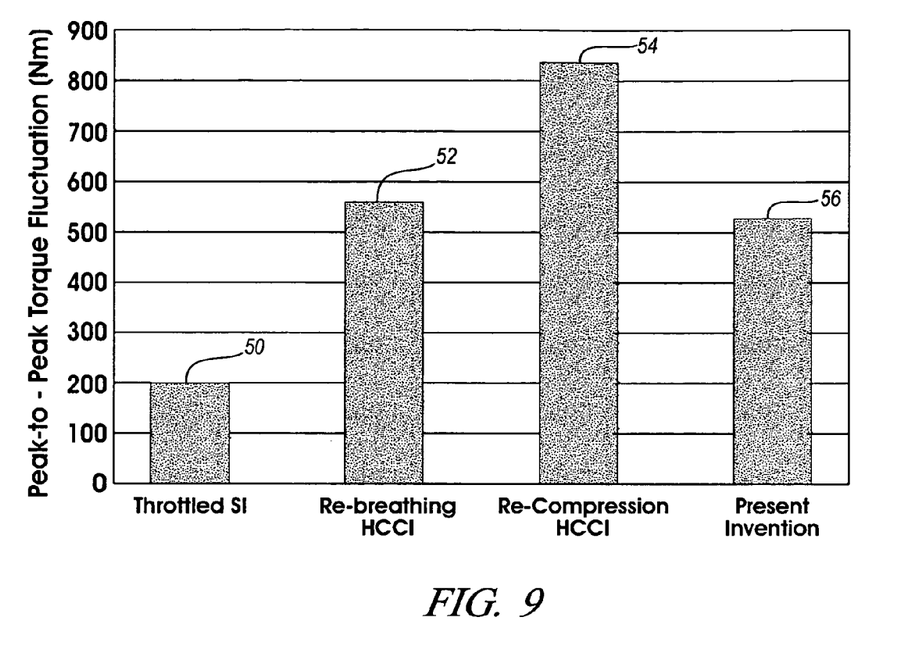
FIG. 9 is a graph of the peak-to-peak torque fluctuation due to pressure force for engine operations with traditional throttled SI, exhaust re-breathing and re-compression HCCI, and the present invention at an engine speed of 1000 rpm and average torque output of 15.2 Nm.

The effectiveness of the present invention on peak-to-peak torque fluctuation reduction is shown in FIGS. 4 and 9. In particular, peak-to-peak torque fluctuation using the present invention 56 is reduced by about 40% from re-compression HCCI 54 to a level comparable to re-breathing HCCI 52 although it is still somewhat higher than that of throttled SI operation 50.

Figure 10:
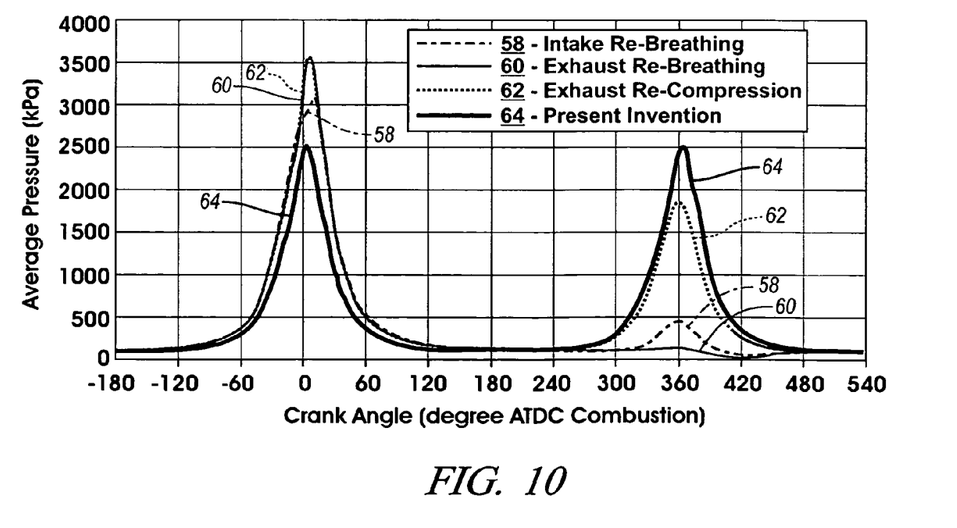
FIG. 10 is a graph of averaged measured cylinder pressures as a function of crank angle for a four-stroke internal combustion engine with variations in different valve strategies at a fueling rate of 6 mg/cycle and 1000 rpm.
Figure 11:
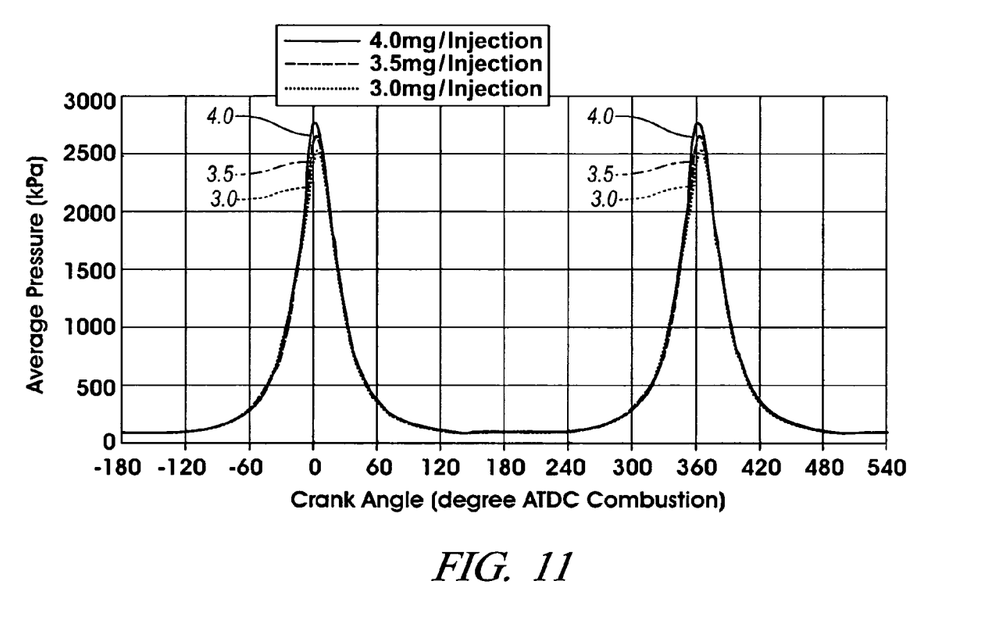
FIG. 11 is a graph of averaged measured cylinder pressures as a function of crank angle for a four-stroke internal combustion engine with variations in engine load according to the present invention.

FIG. 10 shows the measured cylinder pressures as a function of crank angle for intake re-breathing 58, exhaust re-breathing 60, exhaust re-compression 62 and the present invention 64, the four valve strategies described in FIGS. 5–8 at a fixed fueling rate of 6 mg/cycle. It is clear from the figure that, with the present invention, a two-stroke like cylinder pressure history 64 is realized. Finally, the present invention works well for a range of fueling rates from 6 to 8 mg/cycle (3 to 4 mg/injection) as shown in FIG. 11. However, the invention may also extend to operation in other fueling ranges not determined at the time of the test results reported here.

During the tests in which the results shown in FIG. 11 were obtained, a controlled supply of charge air was provided to the engine. If needed in an operating engine, such control could be provided by any suitable means, which could include, for example, providing controlled inlet or exhaust pressures with pumping devices, addition of flow control valves in the intake or exhaust, and/or adjustment of the intake and exhaust valve timing to promote the desired through flow of combustion gases.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A method of operating a four-stroke controlled auto-ignition combustion engine having at least one cylinder with direct fuel injection and containing a piston reciprocably connected with a crank and defining a variable volume combustion chamber including an intake valve controlling communication with an air intake and an exhaust valve controlling communication with an exhaust outlet, the method comprising:

operating the engine with two sequential pairs of expansion and contraction strokes during two revolutions of the crank;

opening both the intake and exhaust valves during terminal portions of the expansion strokes and initial portions of the contraction strokes; and injecting fuel directly into the combustion chamber for mixing with retained gases and igniting the fuel near the ends of the contraction strokes;

whereby combustion gases are expanded to produce power during major portions of the expansion strokes when the valves are closed, combusted gases are blown down intothe exhaust outlet and the air inlet as the valves are opened and the combusted gases are partially redrawn into the cylinder with fresh air during the terminal portions of the expansion strokes, such that the air and exhaust gas charges are heated by the hot exhaust gases; and portions of the charges are expelled into the exhaust outlet and the air intake during the initial portions of the contraction strokes and the remaining portions of the charges and injected fuel are compressed during major portions of the contraction strokes, after closing of the valves, for ignition of the resulting compressed charges of the dilute fuel/air and exhaust gas mixture.

2. A method as in claim 1 including injecting equal fuel charges during consecutive pairs of expansion and contraction strokes to provide equivalent power output for consecutive crank revolutions.

3. A method as in claim 1 wherein lift curves of the intake and exhaust valves are identical in timing and profile.

4. A method as in claim 1 including delivering specified amounts of fresh combustion air to the combustion chamber during each crank revolution.

5. A method as in claim 1 including varying the timing of the intake and exhaust valve openings to provide fresh combustion air flow due to piston motion.

6. A method as in claim 1 including providing an auxiliary charging device to provide fresh combustion air flow.

7. A method as in claim 1 including providing a flow control valve to promote fresh combustion air flow to the combustion chamber.

8. A method of operating a four-stroke controlled auto-ignition combustion engine having at least one cylinder with direct fuel injection and containing a piston reciprocably connected with a crank and defining a variable volume combustion chamber including an intake valve controlling communication with an air intake and an exhaust valve controlling communication with an exhaust outlet, the method comprising:

operating the engine with two sequential pairs of expansion and contraction strokes during two revolutions of the crank;

opening both the intake and exhaust valves during terminal portions of the expansion strokes and initial portions of the contraction strokes; and injecting equal fuel charges directly into the combustion chamber during consecutive pairs of expansion and contraction strokes, for mixing with retained gases, and igniting the fuel near the ends of the contraction strokes to provide equivalent power output for consecutive crank revolutions;

whereby combustion gases are expanded to produce power during major portions of the expansion strokes when the valves are closed, combusted gases are blown down into the exhaust outlet and the air inlet as the valves are opened and the combusted gases are partially redrawn into the cylinder with fresh air during the terminal portions of the expansion strokes, such that the air and exhaust gas charges are heated by the hot exhaust gases; and portions of the charges are expelled into the exhaust outlet and the air intake during the initial portions of the contraction strokes and the remaining portions of the charges and injected fuel are compressed during major portions of the contraction strokes, after closing of the valves, for ignition of the resulting compressed charges of the dilute fuel/air and exhaust gas mixture.

9. A method as in claim 8 wherein lift curves of the intake and exhaust valves are identical in timing and profile.

10. A method as in claim 8 including delivering specified amounts of fresh combustion air to the combustion chamber during each crank revolution.

11. A method as in claim 8 including varying the timing of the intake and exhaust valve openings to provide fresh combustion air flow due to piston motion.

12. A method as in claim 8 including providing an auxiliary charging device to provide fresh combustion air flow.

13. A method as in claim 8 including providing a flow control valve to promote fresh combustion air flow to the combustion chamber.

* * * * *